UNITED STATES PATENT OFFICE.

JOHN G. JARVIS, OF ZYLONITE, MASSACHUSETTS, ASSIGNOR TO THE AMERICAN ZYLONITE COMPANY, OF NEW YORK, N. Y.

PROCESS OF ORNAMENTING ARTICLES HAVING A PYROXYLINE BASE.

SPECIFICATION forming part of Letters Patent No. 417,727, dated December 24, 1889.

Application filed March 22, 1889. Serial No. 304,336. (No specimens.)

*To all whom it may concern:*

Be it known that I, JOHN GEORGE JARVIS, a citizen of the United States, residing at Zylonite, in the county of Berkshire and State of Massachusetts, have invented new and useful Improvements in the Process of Ornamenting Articles having a Pyroxyline Base, of which the following is a specification.

My invention relates to the manufacture of articles having a pyroxyline base, and the purpose thereof is to provide a novel process for the production of ornamental designs upon articles of the class denoted, or upon articles formed of any plastic material.

The invention consists in the novel method of procedure hereinafter fully set forth, and then definitely pointed out in the claims following this specification.

In practicing my invention I take sheets of either white or colored pyroxyline, and by means of any suitable apparatus I emboss thereon any suitable design. I then color or stain the sheet in any desired manner and apply a polish to the surface or surfaces, employing for this purpose rolls or plates in conjunction with heat and pressure. The polish brings out the design with great perfection, causing it to appear beautifully upon the polished face of the sheet.

The stain or dye may be applied to the embossed sheet by dipping it into a bath of coloring-matter, so that the coloring substance runs into the embossed places of the design and thus makes a deposit of color at these points which is deeper than that upon the surface at other points. The sheet thus treated is then submitted to heat and pressure between plates which may or may not be polished. This pressure, in conjunction with heat, removes the embossed surfaces and brings out the deeper stain as a beautiful design, which before pressing was hardly perceptible.

If it is desired to give a polished finish to one side of the sheet, I place the polished plate against that side of the sheet which has not been in contact with the die, and the design, although applied to the other face of the sheet, appears beautifully defined on the polished surface. This polish, however, may also be applied to that surface of the sheet which has been in contact with the die, or to both surfaces, as in either case the process of smoothing and polishing produces the design.

I do not confine myself to any particular kind or method of embossing, as this may be accomplished in many ways—such as by wire-cloth, cut dies, rolls, &c.; neither do I limit my invention to any special method of staining the pyroxyline sheets.

The staining can be applied to cover wholly or partially either or both surfaces by brushing or dipping.

Heretofore and prior to my invention sheets of material having a pyroxyline base have been printed on or decorated and then submitted to heat and pressure. Articles have also been molded or embossed and then stained, and I make no claim to either of these features.

Having thus described my invention, what I claim is—

1. The process hereinbefore set forth, consisting in embossing any suitable design upon an article of a plastic nature, then staining or coloring the same, and finally submitting the article to heat and pressure to smooth the embossed surface, substantially as described.

2. The process set forth, the same consisting in embossing upon a sheet of zylonite or other plastic material any suitable design, applying a stain to said sheet, and then submitting that side which has not been in contact with the embossing-die to heat and pressure and against a polished metal surface, substantially as described.

In testimony whereof I have affixed my signature in presence of two witnesses.

JOHN G. JARVIS.

Witnesses:
HY SCHOMBURG,
M. M. STEWART.